United States Patent [19]

Chen et al.

[11] Patent Number: 5,116,584

[45] Date of Patent: May 26, 1992

[54] METHODS FOR ENLARGING THE USEFUL TEMPERATURE WINDOW FOR NOX REDUCTION IN COMBUSTION SYSTEMS

[75] Inventors: Shih L. Chen, Irvina; William R. Seeker, San Clemente; Loc Ho, Anaheim, all of Calif.

[73] Assignee: Energy and Environmental Research Corporation, Irvine, Calif.

[21] Appl. No.: 681,697

[22] Filed: Apr. 5, 1991

[51] Int. Cl.⁵ ............................................. C01B 21/00
[52] U.S. Cl. ................................................... 423/235
[58] Field of Search ........................... 423/235, 235 D

[56] References Cited

U.S. PATENT DOCUMENTS

| | | | |
|---|---|---|---|
| 3,900,554 | 8/1975 | Lyon | 423/235 |
| 4,208,386 | 6/1980 | Arand et al. | 423/235 |
| 4,863,704 | 9/1989 | Epperly et al. | 423/235 |
| 4,863,705 | 9/1989 | Epperly et al. | 423/235 |
| 5,047,219 | 9/1991 | Epperly et al. | 423/235 |

OTHER PUBLICATIONS

*Optimization of Reburning for Advanced $NO_x$ Control on Coil-Fired Boilers*, Chen et al., Journal of the Air & Waste Management Association, vol. 39, No. 10, pp. 1375-1379, Oct. 1989.

Primary Examiner—Gregory A. Heller
Attorney, Agent, or Firm—Workman, Nydegger & Jensen

[57] ABSTRACT

Methods for reducing $NO_x$ emissions from stationary combustion systems having variable flue gas temperatures are disclosed. Use of an annonium salt of an organic acid enlarges the temperature window for effective selective noncatalytic $NO_x$ reduction thereby accounting for variable flue gas temperatures. Currently preferred ammonium salts of organic acids include ammonium formate, ammonium acetate, and ammonium oxalate. Mixtures of urea and either an ammonium salt of an organic acid or a metallic salt of an organic acid provide an even greater temperature window for $NO_x$ reduction. Currently preferred metallic salts of organic acids include $Ca(COOH)_2$, $Ca(CH_3COO)_2$, $Ca(C_2H_5COO)_2$, $Mg(COOH)_2$, $Mg(CH_3COO)_2$, and $Mg(C_2H_5COO)_2$.

36 Claims, 2 Drawing Sheets

Reduction of NO by $H_2/NH_3$ mixtures $(NO)_0$ = 225 ppm, mass flow through reactor constant and corresponding to 0.1s at 1038 °C ⊠ for 0 - $H_2/NH_3$
⊠ for 0.125
□ for 0.50
× for 1.3
△ for 2.4

$(NH_3)_0 / (NO)_0$ = 2

METHODS FOR ENLARGING THE USEFUL TEMPERATURE WINDOW FOR NOX REDUCTION IN COMBUSTION SYSTEMS

BACKGROUND

1. The Field of the Invention

The present invention is directed to an improved $NO_x$ reduction process for controlling of $NO_x$ emissions. More particularly, the present invention is directed to methods for providing a wider temperature window for effective $NO_x$ reduction than existing processes for controlling $NO_x$ emissions.

2. Technology Review

The problems of waste management in the United States urgently require the development of an environmentally acceptable incineration technology, but for one important class of pollutants, nitrogen oxides (commonly referred to as "$NO_x$"), the presently available $NO_x$ control technology provides only a very limited degree of control.

A survey by the United States Environmental Protection Agency indicates that the United States generates about 140 million metric tons of industrial waste and 230 million metric tons of municipal waste annually. In the past, most waste was disposed of by landfill but such approaches are inherently unsatisfactory because the toxic materials in the waste are not destroyed or rendered innocuous but merely isolated. Recognition of the dangers inherent in disposal by isolation has lead to increasingly tighter control and monitoring of these disposal practices, making them impractical and prohibitively expensive. It is not uncommon for landfills to be closed for reasons of environmental safety even when there are not alternative disposal methods available.

Incineration is potentially the ideal solution to the problem of waste management since toxic organic materials can be completely destroyed and most of the toxic inorganic materials of concern can be converted to an inert glass by operation at temperatures above the ash fusion point. Most of the problems which have given incinerators a poor reputation in the past have satisfactory answers. For instance, emissions of acid gases such as $SO_2$ and HCl can be controlled by wet scrubbers.

However, control of $NO_x$ emissions from incinerators is a problem to which no presently available technology provides a fully satisfactory answer. While the amount of $NO_x$ produced by burning waste can be minimized by managing the combustion process, waste typically contains substantial amounts of chemically bound nitrogen such that $NO_x$ levels are usually unacceptably high, even with careful control of the combustion process. As a result, some form of post combustion $NO_x$ control technology must be used in incineration processes.

Two types of post combustion $NO_x$ control technologies are presently available, selective catalytic reduction (SCR) and selective noncatalytic reduction (SNCR). Applications of SCR to incinerators are generally regarded as nonfeasible because waste contains virtually all possible trace impurities and these impurities can act as catalyst poisons.

Because no better technology currently exits, SNCR processes have been accepted as the best available $NO_x$ control technology for incinerators. In the usual SNCR process, a nitrogen-containing reducing agent, normally either ammonia ($NH_3$) or urea ($H_2NCONH_2$), is contacted with flue gas within a relatively narrow temperature range. The optimum contacting temperature is typically a factor of the reducing agent. A homogeneous gas phase reaction occurs which reduces the NO in the flue gas to molecular nitrogen ($N_2$) and water ($H_2O$). The performance of SNCR in actual incinerator applications has, however, been highly disappointing.

In most applications, the performance of the $NO_x$ reduction processes depends primarily on the available reaction time, i.e., the length of time the flue gas spends in the temperature range suitable for $NO_x$ reduction by the chosen reducing agent. For applications in which the available reaction time is less than 0.2 seconds, $NO_x$ reductions in the 60% to 80% range are typically achieved. For applications in which the available reaction time is greater than 0.2 seconds $NO_x$ reductions in the 80% to 90% range have commonly been achieved.

The design of a modern incinerator provides the post-flame gases with a residence time generally greater than 1.0 seconds in the temperature range appropriate to $NO_x$ reduction processes. Hence, one might expect incinerators to be a very favorable application for selective noncatalytic $NO_x$ reduction. Instead, however, $NO_x$ reduction in incinerators is actually 40% or less.

The poor performance of $NO_x$ reduction processes on incinerators is, in part, a result of the fact that the temperature of the flue gas in incinerators is more highly variable than it is in other combustion systems. Waste is inherently a fuel with a highly variable BTU content. This variability causes the temperature of the flue gases downstream of the combustion zone to be nonhomogeneous in space and to fluctuate in time.

If the temperature of the flue gas is a little too low at the point where the reducing agent is injected, slight or no $NO_x$ reduction occurs. If the temperature is too high, the nitrogen-containing reducing agent ($NH_3$ or $H_2NCONH_2$) has some tendency to oxidize to produce NO, and the net reduction of NO is poor or more NO may even be produced. Because this "temperature window" for the $NO_x$ reduction process is narrow, successful application of the process is always critically dependent on locating the reducing agent injection system at the location at which the average temperature is optimum for the process.

In any application, however, the temperature will be nonhomogeneous, and process performance will be determined by an average over a temperature range. Since this always includes some temperatures which are too high and some which are too low for good $NO_x$ reduction, the practical extent of $NO_x$ control which the process can provide is always significantly less than is achieved in laboratory experiments.

Since the width of the $NO_x$ reduction temperature window increases with increasing reaction time, the longer reaction time available in incinerators compensates, in part, for this difficulty. However, there is an additional problem: the optimum temperature for $NO_x$ reduction may be shifted. For example, as shown in FIG. 1, (quoted from R.K. Lyon and J.E. Hardy, "Discovery and Development of the Thermal DeNO$_x$ Process," *Ind. Eng. Chem. Fundam.* Vol. 25, page 19, 1986; see also *Environmental Science and Technology*, Vol. 21, page 232, 1987) hydrogen ($H_2$) mixed with the ammonia shifts the $NO_x$ reduction temperature window to lower temperatures. The magnitude of the temperature shift increases as the amount of $H_2$ is increased.

This shifting of the temperature window shown in FIG. 1 is a general effect which occurs with other combustible materials, including CO, natural gas, etc. Even though the temperature window may be shifted, the size of the temperature window is not enlarged to a significant degree by the presence of other reducing agents in the combustion effluent stream.

From the foregoing, it is apparent that what is currently needed in the art are methods for controlling $NO_x$ emissions from stationary combustion systems having variable flue gas temperatures. It would also be an advancement in the art to provide methods for controlling $NO_x$ emissions from stationary combustion systems which enlarge the useful temperature window for $NO_x$ reduction.

Such methods for controlling $NO_x$ emissions from stationary combustion systems are disclosed and claimed herein.

BRIEF SUMMARY AND OBJECTS OF THE INVENTION

The present invention relates to methods for reducing $NO_x$ emissions from stationary combustion systems having variable flue gas temperatures. The present invention improves existing selective noncatalytic $NO_x$ reduction processes by enlarging the useful temperature window for $NO_x$ reduction. It has been found that by using an ammonium salt of an organic acid, rather than gaseous ammonia or urea, the adverse effects of variable flue gas temperatures can be substantially reduced or eliminated. Currently preferred ammonium salts of organic acids include ammonium formate, ammonium acetate, and ammonium oxalate.

Experimental results also suggest that mixtures of urea and either an ammonium salt or an organic acid or a metallic salt of an organic acid provide an even greater temperature window for $NO_x$ reduction. Currently preferred metallic salts of organic acids include $Ca(COOH)_2$, $Ca(CH_3COO)_2$, $Ca(C_2H_5COO)_2$, $Mg(COOH)_2$, $Mg(CH_3COO)_2$, and $Mg(C_2H_5COO)_2$.

It is, therefore, an object of the present invention to provide methods for controlling $NO_x$ emissions from stationary combustion systems having variable flue gas temperatures. Another object of the present invention is to provide methods for controlling $NO_x$ emissions from stationary combustion systems which enlarge the useful temperature window for $NO_x$ reduction.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENT

Figure 1:
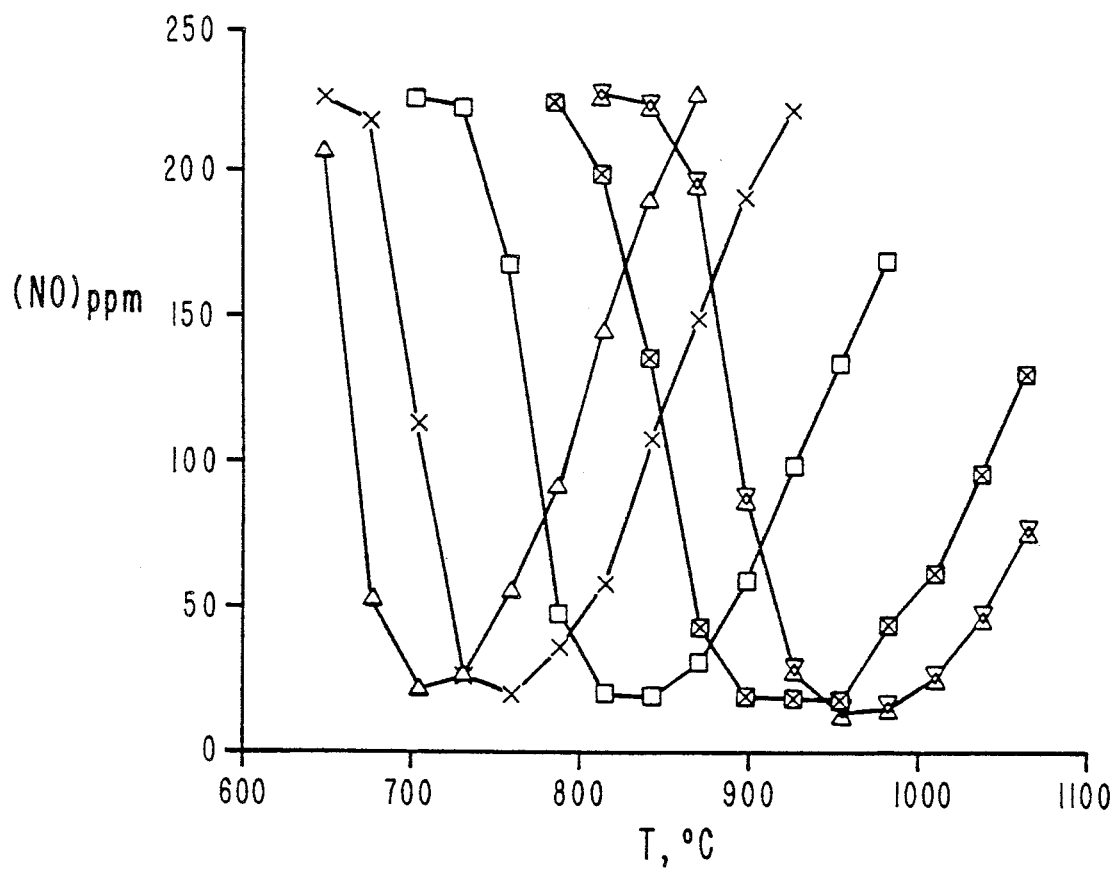
FIG. 1 is a graph illustrating how hydrogen mixed with ammonia shifts the temperature window of the selective noncatalytic $NO_x$ reduction process to lower temperatures.

The present invention relates to methods for reducing $NO_x$ emissions from stationary combustion systems such as power plant boilers, process furnaces, and incinerators which have variable flue gas temperatures. The present invention provides a wider effective temperature window for $NO_x$ reduction than existing $NO_x$ reduction processes using ammonia or urea.

Existing selective noncatalytic $NO_x$ reduction processes control $NO_x$ emissions from stationary combustion systems by injecting nitrogen-containing reducing agents such as ammonia or urea, either alone or in combination with a second reducing agent, into the flue gases. The nitrogen-containing reducing agent causes a homogeneous gas phase reaction to occur which reduces NO to molecular nitrogen and water.

Selective noncatalytic $NO_x$ reduction processes provide excellent $NO_x$ control for flue gases only within a narrow temperature range. Unfortunately, the optimum temperature range for SNCR is readily shifted by the presence of reducing agents such as natural gas, CO, and $H_2$. Because incinerator flue gases have wide variations in temperature and in carbon monoxide concentration, SNCR is generally ineffective at providing suitable $NO_x$ control.

It has been found that by using a nitrogen-containing reducing agent in the form of an ammonium salt of an organic acid, effective $NO_x$ reduction can be obtained over a significantly wider temperature range than by using conventional noncatalytic $NO_x$ reduction processes with ammonia or urea. In this way, the adverse effects of variable flue gas temperatures can be substantially reduced or eliminated.

Within the instant invention, the ammonium salt of an organic acid may be injected into the flue gas as a fine powder or as a mist of a solution of the salt. Suitable ammonium salts of an organic acid are also precursors of a second reducing agent.

Examples of ammonia salts suitable for use within the scope of the present invention include ammonium formate, ammonium acetate, and ammonium oxalate. These ammonium salts are currently preferred since they decompose to ammonia, formic acid, and carbon dioxide (in the case of ammonium oxalate), with the formic acid being further decomposed to hydrogen and/or carbon monoxide. Hence, they do not form undesirable byproducts.

It has also been found that combining urea with a reducing agent provides an even wider temperature window for $NO_x$ reduction. The reducing agent is preferably a salt of an organic acid such as ammonium salts and metallic salts of organic acids. Examples of metallic salts suitable for use in the present invention include $Ca(COOH)_2$, $Ca(CH_3COO)_2$, $Ca(C_2H_5COO)_2$, $Mg(COOH)_2$, $Mg(CH_3COO)_2$, and $Mg(C_2H_5COO)_2$. The molar ratio of equivalent nitrogen (moles of nitrogen) in the reducing agent to nitrogen in $NO_x$ to removed is preferably in the range from about 1:1 to about 3:1. The molar ratio of urea to salt of the organic acid is preferably in the range from about 0:1 to about 4:1.

The present invention can be successfully used to reduce $NO_x$ in flue gases having a temperature in the range from about 1300° F. to about 2000° F. at the point of contacting. The reaction time is preferably greater than 0.01 seconds and more preferably greater than 0.05 seconds. The temperature decay verses time in the reaction zone of the present invention is preferably less than about 2000° F./second, and most preferably less than about 500° F./second. The reduction of $NO_x$ within the scope of the present invention preferably occurs in the presence of excess oxygen, with the oxygen concentration in the flue gases being in the range from about 0.1% to about 15%.

Experiments were conducted to determine $NO_x$ reduction efficiency of various nitrogen-containing reducing agents over a given temperature range. The following examples illustrate the improved $NO_x$ reduction achieved by the present invention over a wide temperature range. These examples are intended to be purely exemplary of the use of the invention and should not be viewed as limiting the scope of the present invention.

EXAMPLE 1

Figure 2:
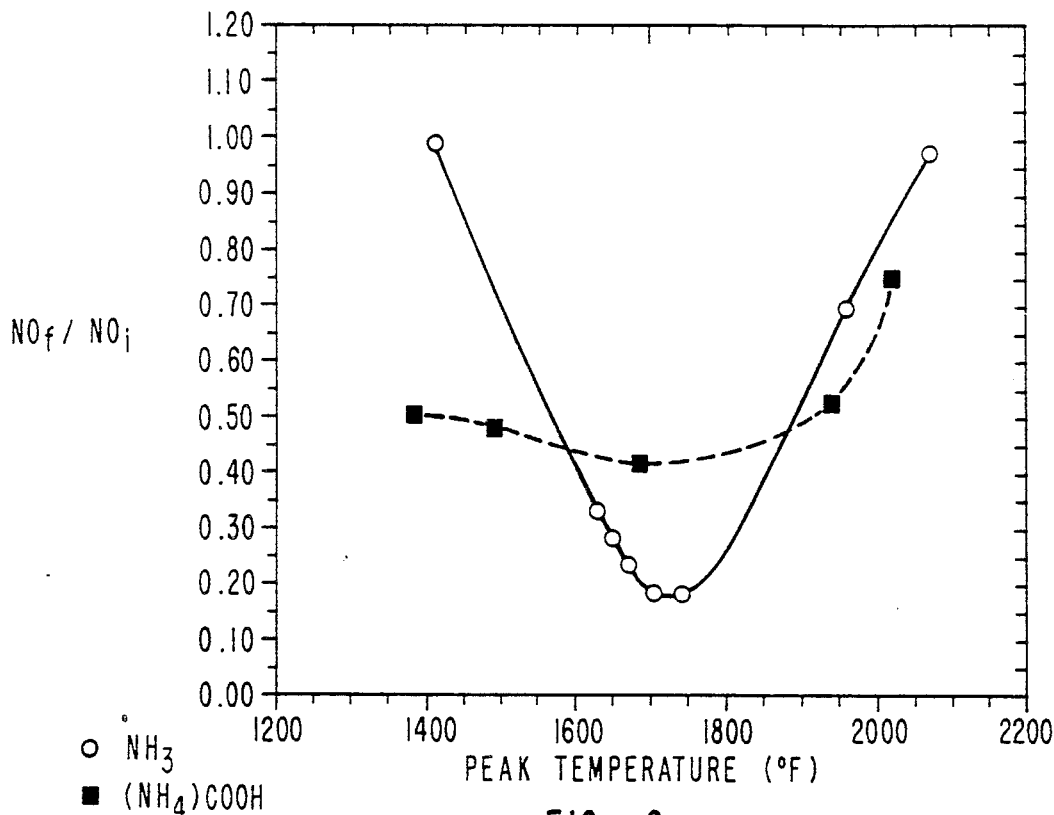
FIG. 2 is a graph comparing $NO_x$ reduction efficiency of ammonium formate and ammonia.

In this example, the $NO_x$ reduction efficiency ($NO_f/NO_i$) of ammonium formate and ammonia were compared over a given temperature range. A 500,000 BTU/hour furnace fired with natural gas at 9% excess oxygen was used to conduct the experiment. The initial $NO_x$ concentration ("$NO_i$") in the combustion effluents ranged from about 234 to about 268 ppm. The ratio of nitrogen-containing reducing agent to $NO_i$ was 1.5. The temperature decay verses time in the reaction zone was approximately 300° F./second. The experimental results are reproduced in Table 1 and shown graphically in FIG. 2.

TABLE 1

| Chemical | $NO_i$, ppm | $N/NO_i$ | Peak Temp., °F. | $NO_f/NO_i$ |
|---|---|---|---|---|
| NH₄COOH | 250 | 1.5 | 1384 | 0.50 |
| NH₄COOH | 250 | 1.5 | 1490 | 0.48 |
| NH₄COOH | 268 | 1.5 | 1685 | 0.41 |
| NH₄COOH | 266 | 1.5 | 1936 | 0.53 |
| NH₄COOH | 234 | 1.5 | 2017 | 0.75 |
| NH₃ | 250 | 1.5 | 1404 | 0.99 |
| NH₃ | 254 | 1.5 | 1560 | 0.52 |
| NH₃ | 246 | 1.5 | 1630 | 0.33 |
| NH₃ | 259 | 1.5 | 1650 | 0.28 |
| NH₃ | 267 | 1.5 | 1705 | 0.18 |
| NH₃ | 247 | 1.5 | 1740 | 0.18 |
| NH₃ | 263 | 1.5 | 1956 | 0.70 |
| NH₃ | 244 | 1.5 | 2067 | 0.98 |

Although the above $NO_x$ reduction efficiency with ammonia was higher at the optimum temperature than the $NO_x$ reduction efficiency with ammonium formate, the temperature window for $NO_x$ reduction was much wider with ammonium formate.

EXAMPLE 2

Figure 3:
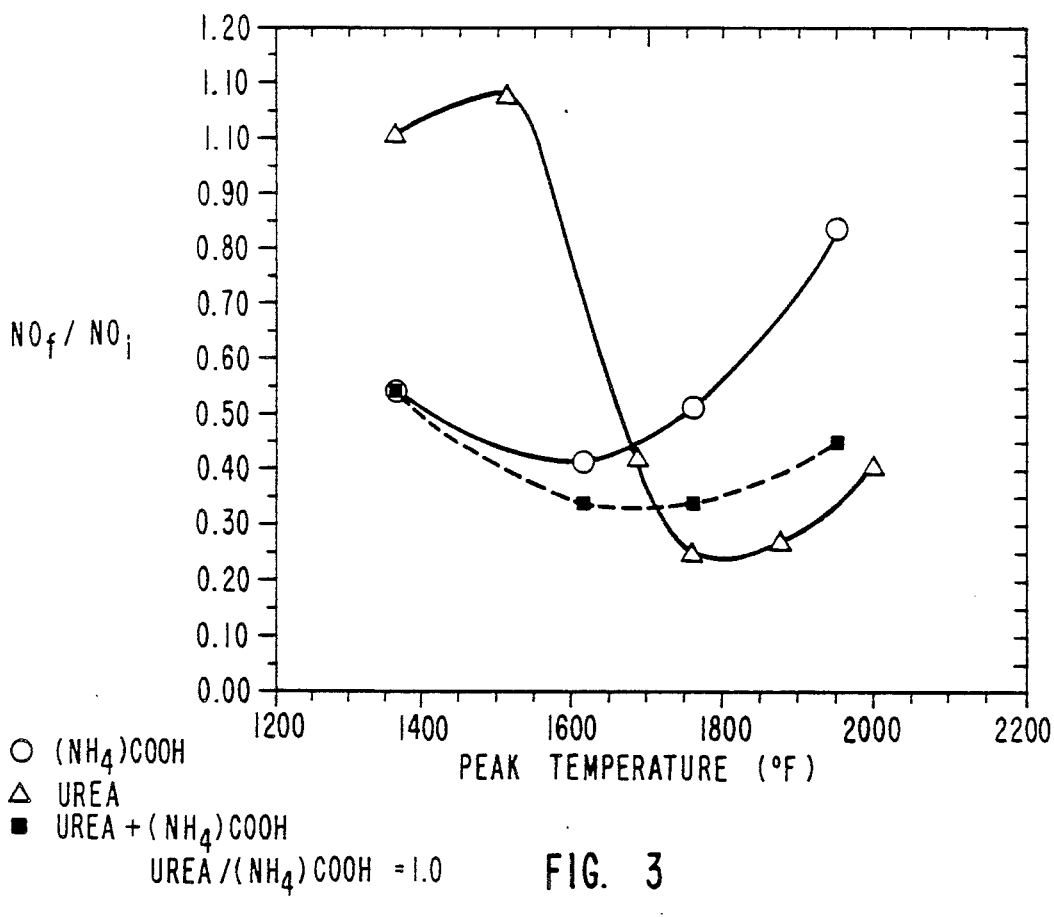
FIG. 3 is a graph comparing $NO_x$ reduction efficiency of ammonium formate, urea, and ammonium formate plus urea.

In this example, the $NO_x$ reduction efficiency ($NO_f/NO_i$) of ammonium formate, urea, and a 50/50 mixture of ammonium formate and urea were compared over a given temperature range. A 500,000 BTU/hour furnace fired with natural gas at 9% excess oxygen was used to conduct the experiment. The initial $NO_x$ concentration ($NO_i$) in the combustion effluents ranged from about 147 to about 156 ppm. The ratio of nitrogen-containing reducing agent to $NO_i$ was 1.5. The temperature decay verses time in the reaction zone was approximately 300° F./second. The experimental results are reproduced in Table 2 and shown graphically in FIG. 3.

TABLE 2

| Chemical | $NO_i$, ppm | $N/NO_i$ | Peak Temp., °F. | $NO_f/NO_i$ |
|---|---|---|---|---|
| urea | 156 | 1.5 | 1365 | 1.01 |
| urea | 152 | 1.5 | 1513 | 1.08 |
| urea | 150 | 1.5 | 1686 | 0.42 |
| urea | 152 | 1.5 | 1760 | 0.25 |
| urea | 154 | 1.5 | 1880 | 0.27 |
| urea | 150 | 1.5 | 1999 | 0.41 |
| NH₄COOH | 155 | 1.5 | 1365 | 0.53 |
| NH₄COOH | 152 | 1.5 | 1616 | 0.41 |
| NH₄COOH | 154 | 1.5 | 1760 | 0.51 |
| NH₄COOH | 154 | 1.5 | 1950 | 0.84 |
| urea + NH₄COOH | 154 | 1.5 | 1365 | 0.54 |
| urea + NH₄COOH | 152 | 1.5 | 1616 | 0.34 |
| urea + NH₄COOH | 147 | 1.5 | 1760 | 0.34 |
| urea + NH₄COOH | 154 | 1.5 | 1950 | 0.42 |

The results of Example 2 confirm that the efficiency of $NO_x$ reduction with urea depends strongly on the injection temperature, with the optimum near 1800° F. Use of ammonium formate significantly widens the temperature window for $NO_x$ reduction, with a shift of the optimum temperature to about 1600° F. When a mixture of ammonium formate and urea are used, the temperature window for effective $NO_x$ reduction expands even wider. Using a mixture of ammonium formate and urea, it is possible to achieve at least 50% $NO_x$ reductions in a window between about 1300° F. to about 2000° F.

From the foregoing, it will be appreciated that the present invention provides methods for controlling $NO_x$ emissions from stationary combustion systems having variable flue gas temperatures and variable amounts of CO in the combustion effluents.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patents is:

1. A process for selectively reducing NO in combustion effluent streams having temperature variations, comprising the single-stage step of introducing a first reducing agent into a combustion effluent stream containing $NO_x$ and excess oxygen, said first reducing agent being in the form of an ammonium salt of an organic acid, said first reducing agent being a precursor of gaseous ammonia and a precursor of a second reducing agent, said first reducing agent being introduced into the combustion effluent stream at a point where the temperature of the combustion effluent stream is in the range from about 1300° F. to about 2000° F., the first reducing agent being present in an amount sufficient to noncatalytically and selectively reduce the $NO_x$ content.

2. A process for selectively reducing NO in combustion effluent streams having temperature variations as defined in claim 1, wherein the first reducing agent is introduced into the combustion effluent stream at a point where the temperature of the combustion effluent stream is in the range from about 1300° F. to about 2000° F.

3. A process for selectively reducing NO in combustion effluent streams having temperature variations as defined in claim 1, wherein the oxygen concentration in the combustion effluent stream is in the range from about 0.1% to about 15%.

4. A process for selectively reducing NO in combustion effluent streams having temperature variations as defined in claim 1, wherein the temperature decay verses time is less than 2000° F./second.

5. A process for selectively reducing NO in combustion effluent streams having temperature variations as defined in claim 1, wherein the temperature decay verses time is less than about 500° F./second.

6. A process for selectively reducing NO in combustion effluent streams having temperature variations as defined in claim 1, wherein the first reducing agent includes an ammonium salt of formic acid.

7. A process for selectively reducing NO in combustion effluent streams having temperature variations as defined in claim 1, wherein the first reducing agent includes an ammonium salt of acetic acid.

8. A process for selectively reducing NO in combustion effluent streams having temperature variations as defined in claim 1, wherein the first reducing agent includes an ammonium salt of oxalic acid.

9. A process for selectively reducing NO in combustion effluent streams having temperature variations as defined in claim 1, wherein the equivalent molar ratio of nitrogen in the first reducing agent to $NO_x$ in the combustion effluent stream is in the range from about 0.5:1 to about 10:1.

10. A process for selectively reducing NO in combustion effluent streams having temperature variations as defined in claim 1, wherein the second reducing agent is gaseous.

11. A process for selectively reducing NO in combustion effluent streams having temperature variations as defined in claim 10, wherein the second reducing agent comprises hydrogen.

12. A process for selectively reducing NO in combustion effluent streams having temperature variations as defined in claim 10, wherein the second reducing agent comprises carbon monoxide.

13. A process for selectively reducing NO in combustion effluent streams having temperature variations as defined in claim 6, further comprising the step of introducing a third reducing agent into the combustion effluent stream, said third reducing agent including urea.

14. A process for selectively reducing NO in combustion effluent streams having temperature variations as defined in claim 13, wherein the total equivalent molar ratio of nitrogen in the reducing agents to $NO_x$ in the combustion effluent stream is in the range from about 0.5:1 to about 10:1.

15. A process for selectively reducing NO in combustion effluent streams having temperature variations as defined in claim 13, wherein the molar ratio of the third reducing agent to the first reducing agent is in the range from about 0:1 to about 4:1.

16. A process for selectively reducing NO in combustion effluent streams having temperature variations as defined in claim 6, further comprising the step of introducing a third reducing agent into the combustion effluent stream, said third reducing agent including ammonium carbonate.

17. A process for selectively reducing NO in combustion effluent streams having temperature variations as defined in claim 16, wherein the total equivalent molar ratio of nitrogen in the reducing agents to $NO_x$ in the combustion effluent stream is in the range from about 0.5:1 to about 10:1.

18. A process for selectively reducing NO in combustion effluent streams having temperature variations as defined in claim 16, wherein the molar ratio of the third reducing agent to the first reducing agent is in the range from about 0:1 to about 4:1.

19. A process for selectively reducing NO in combustion effluent streams having temperature variations as defined in claim 6, further comprising the step of introducing a third reducing agent into the combustion effluent stream, said third reducing agent including ammonium sulfate.

20. A process for selectively reducing NO in combustion effluent streams having temperature variations as defined in claim 19, wherein the total equivalent molar ratio of nitrogen in the reducing agents to $NO_x$ in the combustion effluent stream is in the range from about 0.5:1 to about 10:1.

21. A process for selectively reducing NO in combustion effluent streams having temperature variations as defined in claim 19, wherein the molar ratio of the third reducing agent to the first reducing agent is in the range from about 0:1 to about 4:1.

22. A process for selectively reducing NO in combustion effluent streams having temperature variations, comprising the single-stage step of introducing a mixture of urea and a salt of an organic acid into a combustion effluent stream containing $NO_x$ and excess oxygen at a point where the temperature of the combustion effluent stream is in the range from about 1300° F. to about 2000° F., wherein the oxygen concentration in the combustion effluent stream is in the range from about 0.1% to about 15%, the equivalent molar ratio of nitrogen in the mixture to $NO_x$ in the combustion effluent stream is in the range form about 0.5:1 to about 10:1, such that the temperature window for effectuating $NO_x$ reduction is widened.

23. A process for selectively reducing NO in combustion effluent streams having temperature variations as defined in claim 22, wherein the salt of an organic acid includes an ammonium salt of an organic acid.

24. A process for selectively reducing NO in combustion effluent streams having temperature variations as defined in claim 22, wherein the ammonium salt of an organic acid includes ammonium formate.

25. A process for selectively reducing NO in combustion effluent streams having temperature variations as defined in claim 22, wherein the ammonium salt of an organic acid includes ammonium acetate.

26. A process for selectively reducing NO in combustion effluent streams having temperature variations as defined in claim 22, wherein the ammonium salt of an organic acid includes ammonium oxalate.

27. A process for selectively reducing NO in combustion effluent streams having temperature variations as defined in claim 22, wherein the salt of an organic acid includes a metallic salt of an organic acid.

28. A process for selectively reducing NO in combustion effluent streams having temperature variations as defined in claim 22, wherein the metallic salt of an organic acid includes $Ca(COOH)_2$.

29. A process for selectively reducing NO in combustion effluent streams having temperature variations as defined in claim 22, wherein the metallic salt of an organic acid includes $Ca(CH_3COO)_2$.

30. A process for selectively reducing NO in combustion effluent streams having temperature variations as defined in claim 22, wherein the metallic salt of an organic acid includes $Ca(C_2H_5COO)_2$.

31. A process for selectively reducing NO in combustion effluent streams having temperature variations as defined in claim 22, wherein the metallic salt of an organic acid includes $Mg(COOH)_2$.

32. A process for selectively reducing NO in combustion effluent streams having temperature variations as defined in claim 22, wherein the metallic salt of an organic acid includes $Mg(CH_3COO)_2$.

33. A process for selectively reducing NO in combustion effluent streams having temperature variations as defined in claim 22, wherein the metallic salt of an organic acid includes $Mg(C_2H_5COO)_2$.

34. A process for selectively reducing NO in combustion effluent streams having temperature variations as defined in claim 22, wherein the temperature decay verses time is less than about 2000° F./second.

35. A process for selectively reducing NO in combustion effluent streams having temperature variations as defined in claim 22, wherein the temperature decay verses time is less than about 500° F./second.

36. A process for selectively reducing NO in combustion effluent streams having temperature variations as defined in claim 22, wherein the molar ratio of urea to the reducing agent is in the rage from about 0:1 to about 4:1.

* * * * *

UNITED STATES PATENT AND TRADEMARK OFFICE
CERTIFICATE OF CORRECTION

| | | |
|---|---|---|
| PATENT NO. | : | 5,116,584 |
| DATED | : | May 26, 1992 |
| INVENTOR(S) | : | SHIH L. CHEN et al. |

It is certified that error appears in the above-identified patent and that said Letters Patent is hereby corrected as shown below:

```
Column 4, line 52, "byproducts" should be --by-products--
Column 4, line 62, after "NOx to" insert --be--
Column 5, line 3, "verses" should be --versus--
Column 5, line 30, "verses" should be --versus--
Column 8, line 37, "is" should be --being--
Column 7, line 9, "verses" should be --versus--
Column 10, line 6, "verses" should be --versus--
Column 10, line 10, "verses" should be --versus--
Column 10, line 14, "rage" should be --range--
```

Signed and Sealed this

Twenty-first Day of September, 1993

Attest:

BRUCE LEHMAN

*Attesting Officer*   *Commissioner of Patents and Trademarks*